United States Patent
Klein

[19]

[11] Patent Number: 5,947,433
[45] Date of Patent: Sep. 7, 1999

[54] ATTACHMENT SUPPORT

[75] Inventor: Traugott Klein, Herrenberg, Germany

[73] Assignee: Hewlett-Packard Company, Palo Alto, Calif.

[21] Appl. No.: 08/965,170

[22] Filed: Nov. 6, 1997

[30] Foreign Application Priority Data

Aug. 9, 1997 [DE] Germany ............................. 29714 293

[51] Int. Cl.⁶ .................................................. A47B 96/06
[52] U.S. Cl. ........................................................ 248/214
[58] Field of Search ................................... 248/214, 215, 248/340, 339, 228.7, 230.7, 231.81, 289.11, 290.1; D8/380

[56] References Cited

U.S. PATENT DOCUMENTS

| | | | |
|---|---|---|---|
| D. 328,240 | 7/1992 | Polski | D8/367 |
| D. 337,938 | 8/1993 | Shaw et al. | D8/380 |
| 557,773 | 4/1896 | Deplanty et al. | 248/214 |
| 2,869,812 | 1/1959 | Hamel | 248/214 |
| 3,536,281 | 10/1970 | Meehan et al. | 248/73 |
| 4,628,777 | 12/1986 | Guarr | 24/535 |
| 4,858,867 | 8/1989 | King | 248/214 |
| 4,944,434 | 7/1990 | Hamilton | 224/42.45 |
| 5,480,116 | 1/1996 | Callas | 248/228.4 |

*Primary Examiner*—Ramon O. Ramirez
*Assistant Examiner*—Anita M. King

[57] ABSTRACT

An apparatus is proposed for supporting a device on an apparatus, preferably with the capability of vertical positioning. The apparatus is characterized by beveled areas opposite one another, preferably for resting the apparatus on support elements with different shapes, such as cylindrical support rods having different diameters, and an elongated and essentially rectangular area, which preferably extends from the beveled areas, for supporting the apparatus on elongated apparatus such as a board with an elongated edge.

4 Claims, 4 Drawing Sheets

ATTACHMENT SUPPORT

BACKGROUND OF THE INVENTION AND PRIOR ART

A number of support apparatus are known for attaching devices to beds or other transportation devices such as ambulances, etc., and in particular provided for vertical positioning of the devices.

FIG. 1 shows a prior art attachment apparatus 10. A support plate for supporting a device (not shown) is attached to a vertical apparatus 40 by two hooks 30 as support means. In this case, the shape of the hooks 30 is adapted to a support element 50 of the apparatus 40, such as the cylindrical support rod 50 shown in FIG. 1. Accordingly, the inner surface 60 of the hooks 30 is adapted in shape to correspond to the supporting surface 50, as indicated for example in FIG. 1 by a curved area 60.

A disadvantage of the prior art attachment apparatus 10 is that the shape of the inner surface 60 of the hooks 30 must be adapted in each case to the corresponding shape of the various apparatus 40 and that an unsatisfactory fit can lead to insufficient mechanical support and attachment. Especially in medical applications in stationary or mobile situations, such as in hospitals, in an ambulance, etc., the apparatus 10 must, for a variety of different support means 50, provide adequate support, be rapidly attachable, and furthermore satisfy the increased safety requirements in such applications.

SUMMARY OF THE INVENTION

It is an object of the present invention to provide the capability to attach devices to various means of support, in particular with the ability for vertical positioning.

An apparatus in accordance with the invention will be described for supporting a device on an apparatus preferably with the ability for vertical positioning. The apparatus has beveled areas opposite one another, preferably for resting the apparatus on support elements with differing shapes such as cylindrical support rods with differing dimensions, and an elongated and essentially rectangular area extending preferably from the beveled areas for supporting the apparatus on elongated apparatus such as boards or elongated edges.

The apparatus of the invention permits simplified support of devices on a variety of supporting surfaces, in particular those in a vertical position.

BRIEF DESCRIPTION OF THE DRAWINGS

The invention will be explained in the following with reference to the drawings.

DETAILED DESCRIPTION OF THE DRAWINGS

Figure 1:
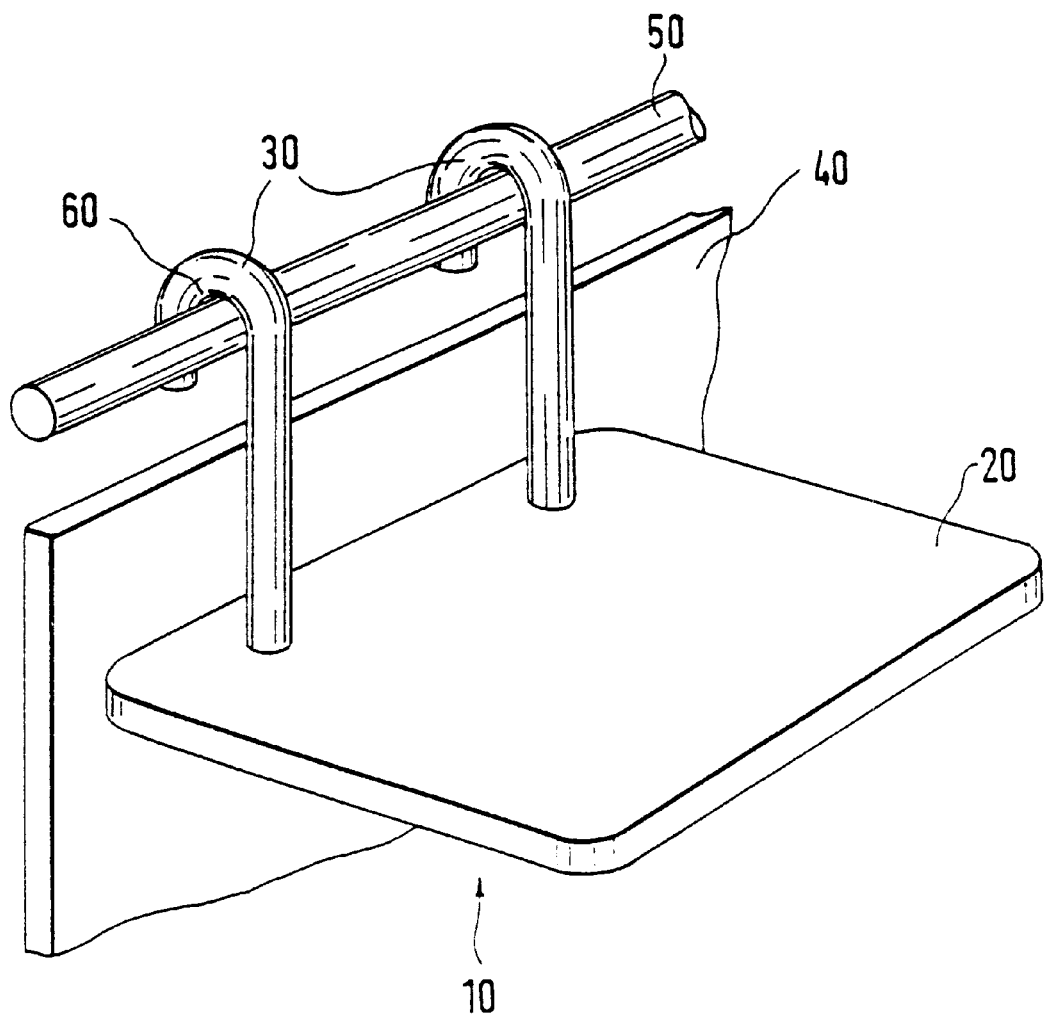
FIG. 1 shows a prior art attachment apparatus 10.
Figure 2A:
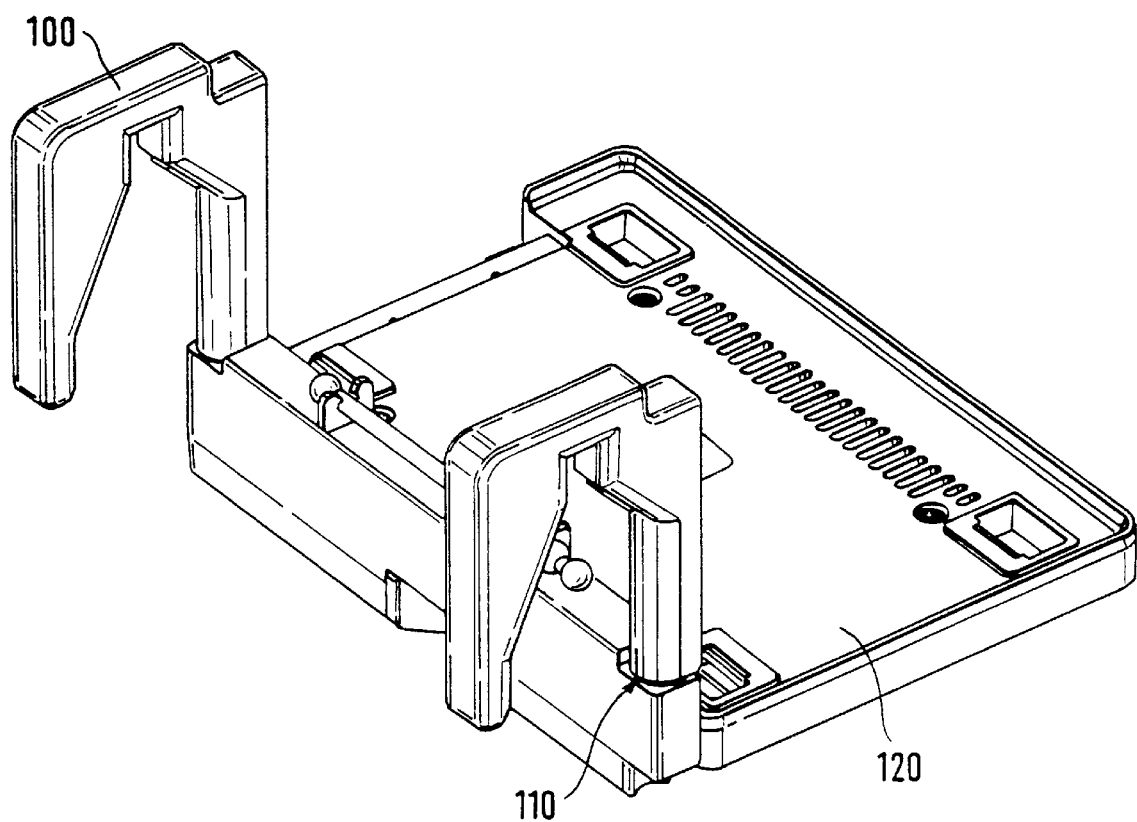
FIG. 2a is a perspective view of a support 100 of the invention.
Figure 2B:
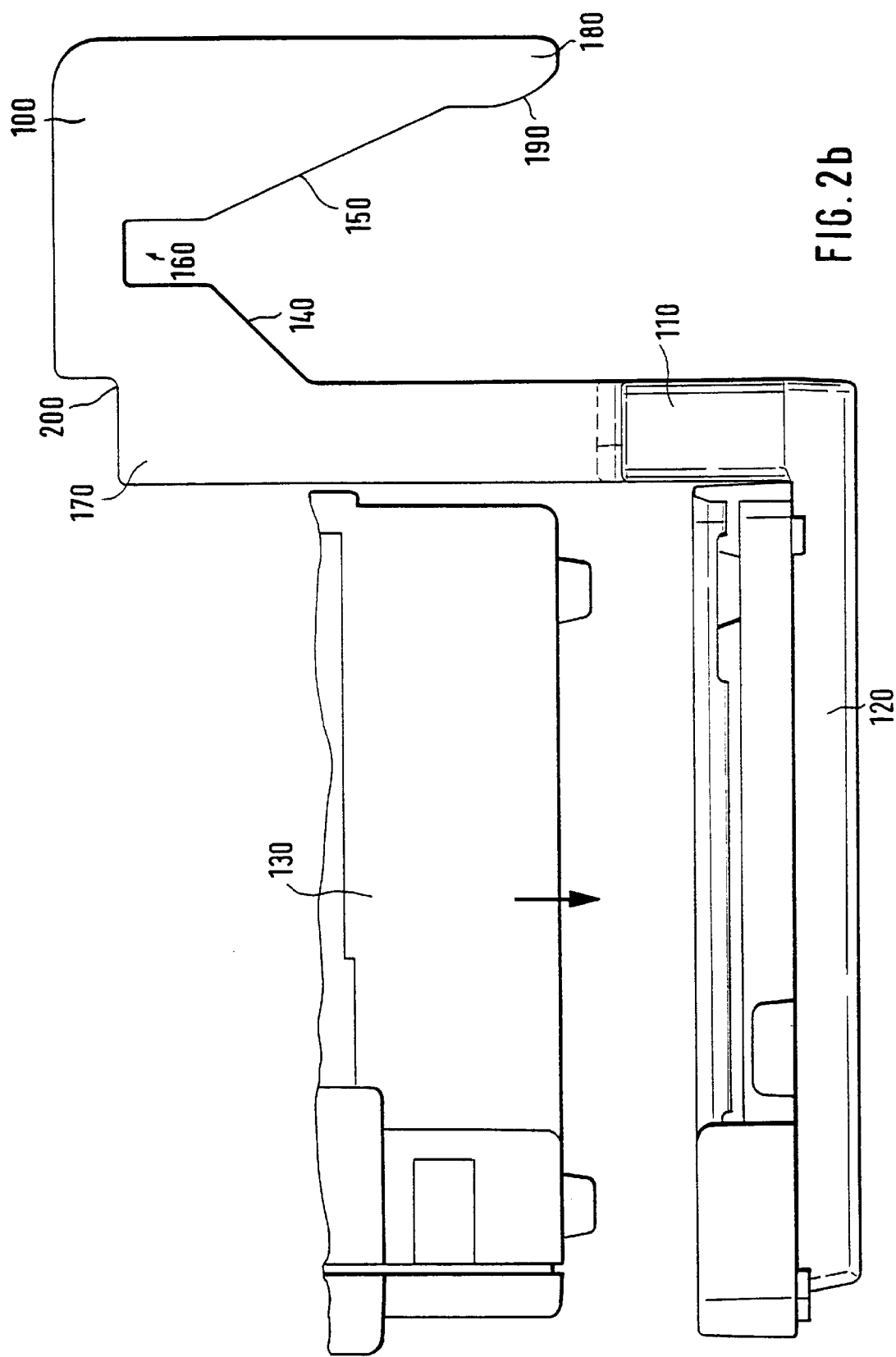
FIG. 2b shows support 100 in a two-dimensional view.

FIG. 2a shows a support 100 of the invention in a perspective view, and FIG. 2b shows the support 100 in a two-dimensional view. The support 100 has the form of a support hook 100 and is connected in a rotatable manner by an optional hinge 110 to a support plate 120 serving to accommodate a device 130. The support hook 100 has a first beveled area 140 and a second beveled area 150. The beveled areas 140 and 150 opposite one another serve to accommodate the support hook 100 on support elements 50 of varying shapes (in accordance with FIG. 1), such as cylindrical support rods 50 with different diameters.

It is to be noted that connection of the support to the support plate 120 is not essential, serving only to illustrate one possible use for attachment support 100. On the contrary, the support 100 of the invention can be connected to a wide variety of apparatus for any type of application. However, the support 100 can preferably be connected to a support plate 120 in accordance with applicant's German utility model DE 297 14 294.1.

The support hook 100 moreover has an elongated and essentially rectangular area 160 that extends preferably from the beveled areas 140 and 150. The elongated area 160 serves to attach the support hook 100 to elongated apparatus 40 (as in FIG. 1) such as boards or elongated edges.

Finally, the support hook 100 preferably has an additional part 180 situated opposite one axis 170 of the support hook, said part having an essentially rounded area 190 that extends from the second beveled area 150. The part 180 serves to extend the depth of hook attachment, so that the device 130 together with the support hook is prevented from inadvertent disengagement, for example during transport over rough terrain.

In a preferred embodiment, the support hook 100 also has a notch 200, which is suited for example to guiding a cable when wrapping it around the support hook 100.

Figure 3:
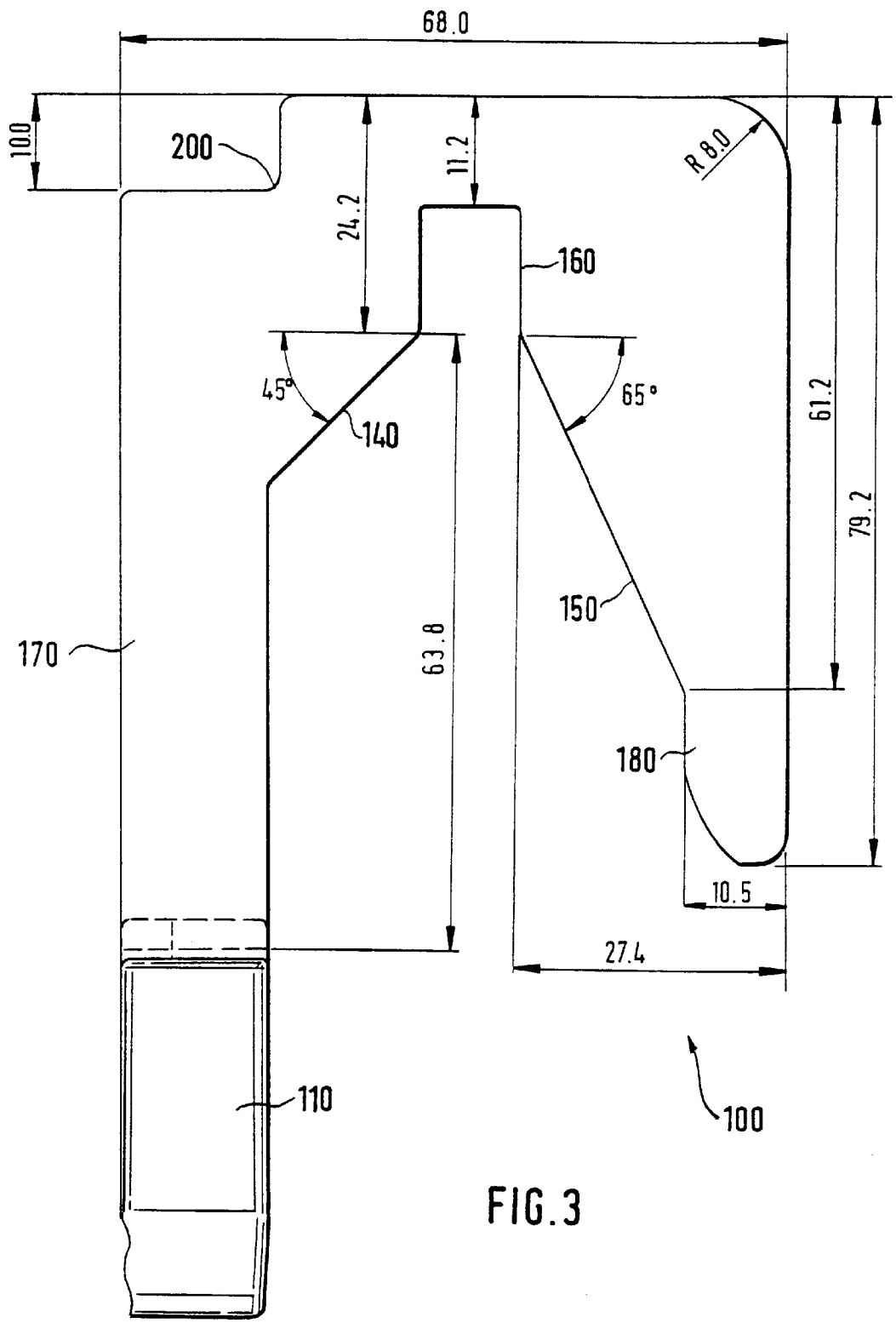
FIG. 3 shows an embodiment of support 100 with preferred dimensions (in mm).

FIG. 3 shows an embodiment of the support hook 100 with preferred dimensions (in mm). The dimensions indicated in FIG. 3, in particular the angles of the first and second beveled areas 140 and 150, as well as the elongated area 160, have proven particularly advantageous for a wide variety of medical applications, and in particular on hospital beds conforming to varying standards from country to country, and thus provide broad coverage for different applications. Other dimensions, however, are equally conceivable and depend on the application at hand.

It should be noted that the support hook 100 of the invention can be combined with any apparatus, such as the support plate 120. The support hook 100 can also be connected directly, or via intermediate elements, to the device 130 (see FIG. 2). It should also be noted that the hinge 110 is optional and is in particular suited to rotating the attachment apparatus out of the way after use to provide space.

The shape of support 100 according to the invention permits a wide variety of attachment possibilities to apparatus 40 of varying shapes. However, the use of support 100 is not limited to support hooks, as depicted in FIGS. 2 and 3, but rather allows adjustment for any other possible means of attachment such as threaded supports or for suspending objects on apparatus 40 of varying shapes and so on.

Slip-resistant coatings are preferably applied to the supporting surfaces of the first and/or second beveled areas 140, 150 to reduce or prevent inadvertent slipping or rotation of the support 100.

The support 100 is preferably made of a plastic on polyamide basis. The plastic GRIVORY GV-6H, which exhibits strength comparable to that of aluminum, has proven especially suitable.

I claim:

1. An apparatus for supporting a device on an elongated support having plural possible shapes, comprising:

beveled hanger hooks situated opposite one another and exhibiting opposed arms that provide fixed concave openings for receiving said elongated support and for resting the apparatus on said elongated support, said fixed concave openings having opposed edges that are initially parallel and then slope towards each other, one of said arms of each hook including a downwardly extending portion for attaching to said device, said opposed arms further shaped to receive said plural possible shapes; and rectangular apertures formed into said concave openings of the beveled hanger hooks for receiving at least one of said plural possible shapes of said elongated support to enable the apparatus to be supported thereby.

2. The apparatus in accordance with claim 1, wherein each of said beveled hanger hooks includes a downwardly extending portion with a rounded terminus.

3. The apparatus in accordance with claim 1, wherein an exterior surface of each of said beveled hanger hooks includes a notch that is suited to receive a cable.

4. The apparatus in accordance with claim 1, wherein each of said beveled hanger hooks incorporates a hinge at one extent thereof for attaching said apparatus to an additional apparatus in a manner permitting rotation.

\* \* \* \* \*